United States Patent [19]

Guth et al.

[11] 4,288,408

[45] Sep. 8, 1981

[54] APPARATUS FOR THE DIACRITIC CRACKING OF HYDROCARBON FEEDS FOR THE SELECTIVE PRODUCTION OF ETHYLENE AND SYNTHESIS GAS

[75] Inventors: Eugene D. Guth, Villa Park; LeGrand A. Daly; John K. Arand, both of Rancho Palos Verdes, all of Calif.

[73] Assignee: L. A. Daly Company, Rancho Palos Verdes, Calif.

[21] Appl. No.: 922,675

[22] Filed: Jul. 7, 1978

[51] Int. Cl.³ .......................... B01J 7/00; B01J 10/00
[52] U.S. Cl. ................................ 422/193; 208/48 Q; 422/194; 422/207; 422/202; 422/151; 422/156
[58] Field of Search .............. 422/151, 156, 158, 198, 422/202, 207, 189, 150, 194, 193; 208/48 Q, 129; 260/679, 683 R; 47/93, 94

[56] References Cited

U.S. PATENT DOCUMENTS

| 2,781,246 | 2/1957 | Goldtrap | 422/156 X |
|---|---|---|---|
| 2,781,247 | 2/1957 | Krejci | 422/156 |
| 2,905,731 | 9/1959 | Seed | 260/679 R |
| 3,018,309 | 1/1962 | Krejci | 422/202 |
| 3,055,957 | 9/1962 | Braconier et al. | 260/683 R |
| 3,073,875 | 1/1963 | Braconier et al. | 260/679 R |
| 3,565,968 | 2/1971 | Hicks, Jr. | 260/683 R |
| 3,897,217 | 7/1975 | Cheng | 422/156 |
| 4,036,181 | 7/1977 | Matovich | 422/150 X |
| 4,134,824 | 1/1979 | Kanin et al. | 260/683 |
| 4,134,966 | 1/1979 | Austin | 422/158 X |

FOREIGN PATENT DOCUMENTS

| 851673 | 10/1960 | United Kingdom . |
|---|---|---|
| 958046 | 6/1961 | United Kingdom . |
| 891864 | 3/1962 | United Kingdom . |
| 921305 | 3/1963 | United Kingdom . |
| 922775 | 4/1963 | United Kingdom . |
| 929136 | 6/1963 | United Kingdom . |
| 1104077 | 2/1968 | United Kingdom . |
| 1440424 | 7/1973 | United Kingdom . |
| 1503871 | 3/1978 | United Kingdom . |

Primary Examiner—Michael Marcus
Attorney, Agent, or Firm—Blakely, Sokoloff, Taylor & Zafman

[57] ABSTRACT

Apparatus for the diacritic cracking of heavy hydrocarbon feeds includes a combustor for burning a fuel, to provide the hot combustion products to the reactor. The combustor is water cooled and includes gas filming with an appropriate gas such as $N_2$ or $CO_2$ to avoid coking in the combustor by preventing impingement of the fuel and combustion products on the combustor walls. The reactor is of reduced cross-section, also preferably utilizing gas filming to avoid coking on the reactor walls. Feed stock injectors are provided adjacent the reactor inlet. Adjacent the outlet end of the reactor is a quench section designed for the rapid injection of a quench fluid to reduce the stream temperature below that at which further cracking will take place, with the quench injectors also being gas filmed to avoid the coking thereof. Thereafter a tubular heat exchanger is provided to remove additional heat from the primary flow stream from the reactor for recovery purposes, the heat exchanger again using gas filming to minimize the build-up of coking and tar build-up, particularly encouraged by the rapidly decreasing temperatures. The gaseous products are then further quenched and cooled for processing by conventional means.

21 Claims, 11 Drawing Figures

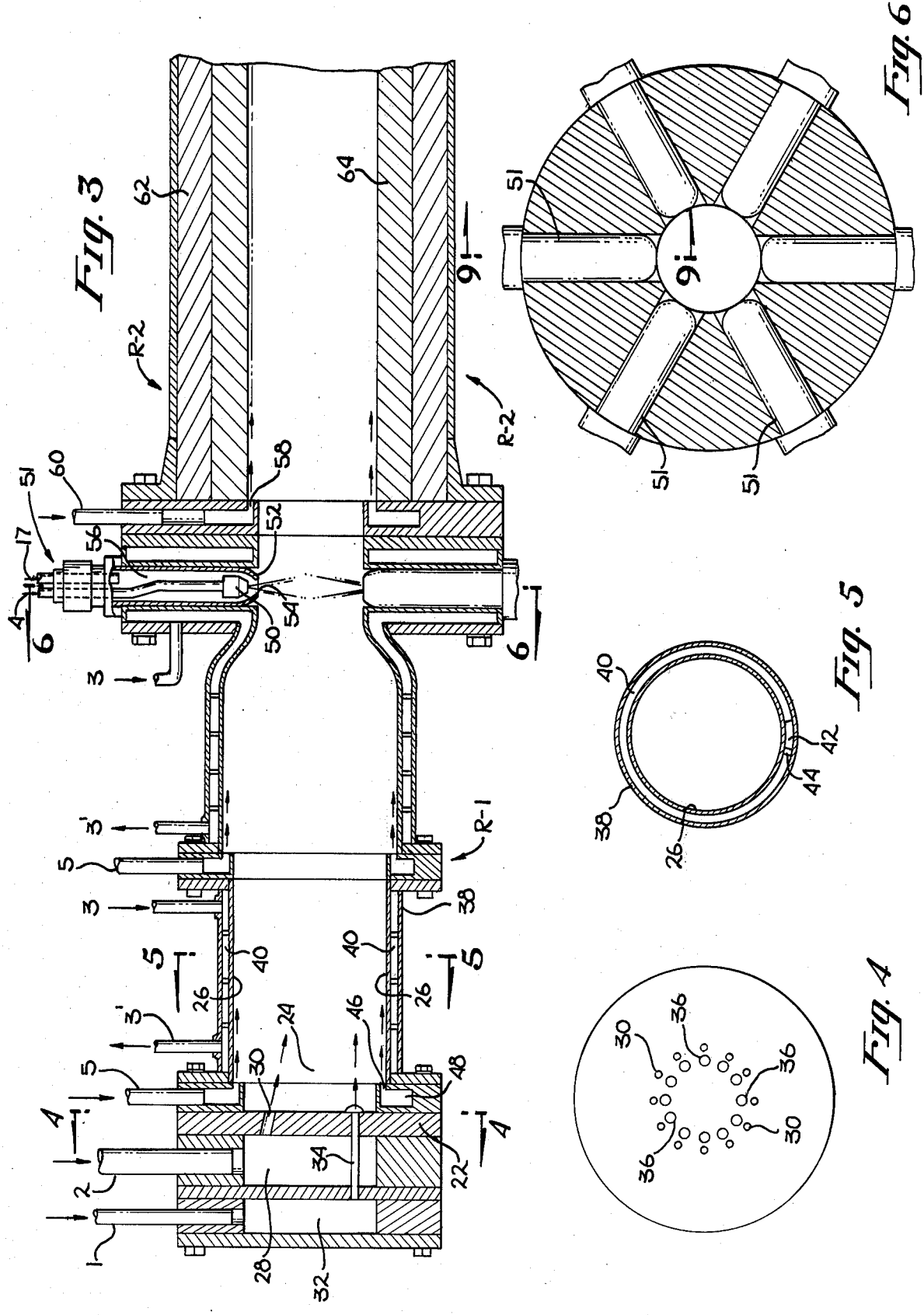

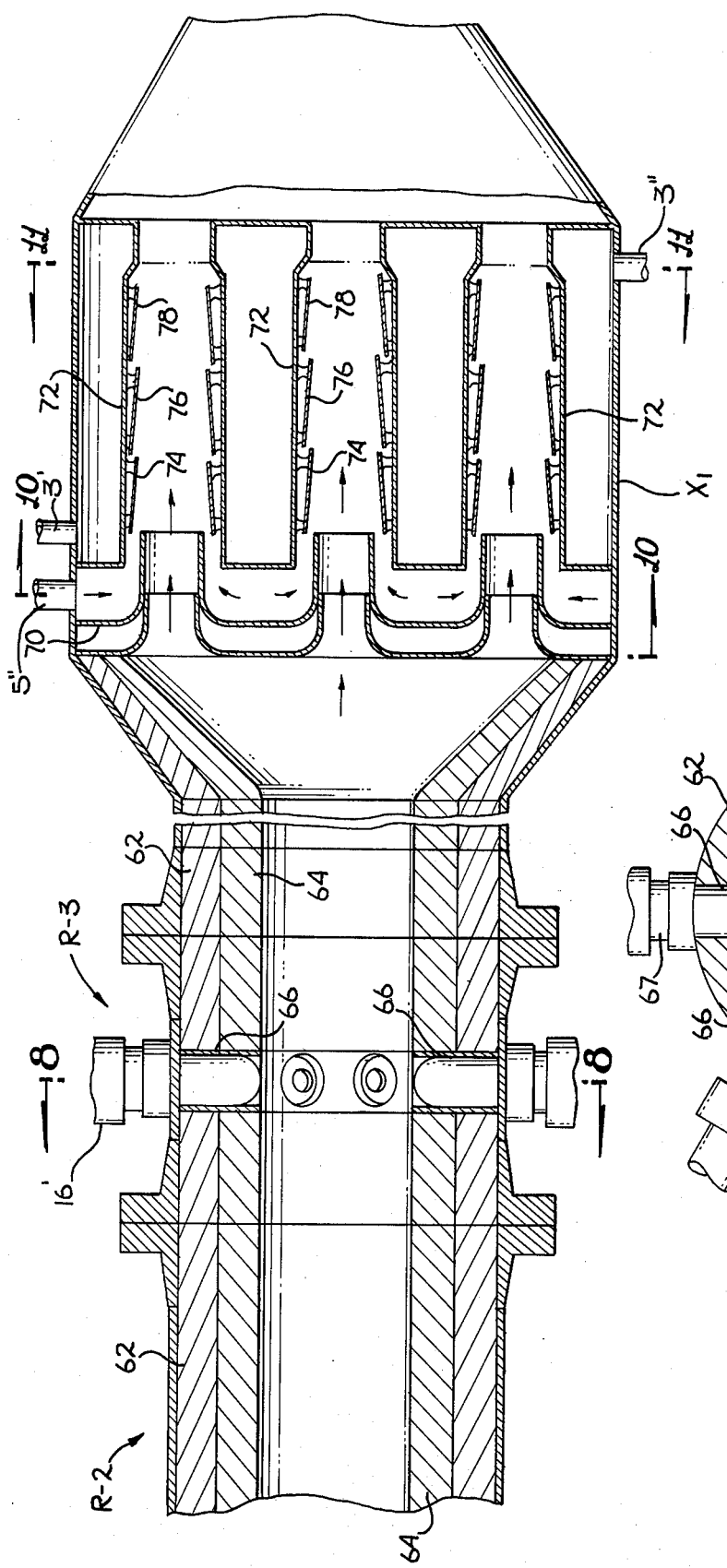
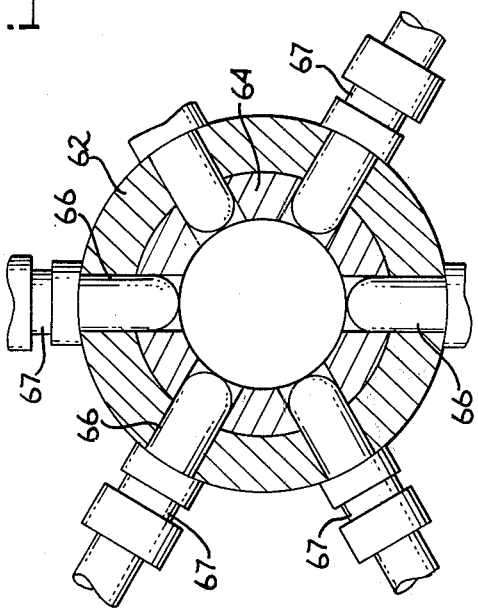
Fig. 7
Fig. 8

APPARATUS FOR THE DIACRITIC CRACKING OF HYDROCARBON FEEDS FOR THE SELECTIVE PRODUCTION OF ETHYLENE AND SYNTHESIS GAS

BACKGROUND OF THE INVENTION

1. Field of the Invention

The present invention relates generally to improvements in apparatus for the non-tubular cracking of heavy hydrocarbon feeds for the purposes of producing ethylene and other valuable olefin products as well as chemical grade synthesis gas.

2. Prior Art

A great deal of prior work has been done in connection with the cracking of hydrocarbon feed stocks to obtain basic chemicals such as ethylene, acetylene and propylene. Presently, the most common approach involves the cracking of a hydrocarbon feed in the presence of steam in a fired tubular furnace. In such a steam cracking process the thermal energy of the combustion gases is transferred to the feed through the metal walls of the tubes and therefore the tube metallurgy becomes one of the limiting factors with respect to the maximum cracking temperature which is usually several hundred degrees below that which can be achieved in a non-tubular cracking process such as the diacritic cracking process described herein. To obtain proper cracking conditions, the residence time in a steam cracker must be substantially longer to compensate for the lower temperatures. For example, residence time of about 0.25 to 0.50 seconds is typical in many modern steam cracker designs. Such longer residence times lead to a furnace effluent hydrocarbon composition that is significantly different from that obtained from a process utilizing a non-tubular reactor. For example, acetylene and ethylene yields are generally lower but the yields of propylene, $C_4$ olefins and pyrolysis gasoline are usually somewhat higher.

In view of the shortcomings of steam cracking considerable work has been done in connection with the thermal cracking of hydrocarbons to obtain higher yields of ethylene or in some instances acetylene. For example, U.S. Pat. No. 3,790,838 deals with the general process of a single pass cracking method for the production of mixtures of acetylene and ethylene (with the primary emphasis on acetylene) in which a hydrocarbon feed stock is cracked by "thermal shock" when contacted with hot gases produced by the combustion of a fuel. The apparatus used comprises a combustion furnace to which may be supplied steam, oxygen and a fuel, with the hot combustion gases passing into a reactor having a venturi constriction positioned near the combustion furnace exhaust port and the feed stock inlet. Quenching at the reactor outlet is provided by coolant spray nozzles. No provision is made in the apparatus for the minimization of coking problems which typically result in such a process, especially when heavy hydrocarbon feed stocks are used as are contemplated for the preferred embodiment of the present invention.

U.S. Pat. No. 2,751,334 discloses a continuous flash coking process to vaporize hydrocarbons and produce coke from a hydrocarbon feed. The apparatus receives a retort gas and directs the gas tangentially into a generally circular reaction chamber as a result of baffles therein. The feed particles are sprayed into the vortex of hot gases with the products of the process ultimately proceeding axially through a lock hopper to a coke draw-off line.

U.S. Pat. No. 3,178,488 discloses apparatus for the production of unsaturates by the non-uniform mixing of paraffin hydrocarbons with hot combustion gases. The apparatus comprises a combustor for providing hot combustion gases to which the hydrocarbon feed is controllably injected into at the throat of a venturi. As a result of the controlled injection, two cracking zones are formed within the reaction zone, the interior zone being characterized by a high velocity gas, high temperature and thorough mixing by the combustion gases with the hydrocarbon cracking feed, and the outer cracking zone being characterized by lower velocity, lower temperature and less than thorough mixing of the feed stock and combustion gases. The apparatus includes a water spray quench at the reactor outlet.

U.S. Pat. No. 2,823,243 discloses a process and apparatus for the pyrolysis of hydrocarbons wherein hydrogen and oxygen are burned and mixed with a gaseous hydrocarbon stream. Means are provided to establish a helically moving blanket of tempering gas around the combustion gas to cool the combustion gas. A venturi is provided downstream of the region of injection of the feed stock, with a second venturi being placed at right angles thereto subsequent to the quench. Similarly U.S. Pat. No. 2,767,233 discloses apparatus for use in the thermal transformation of hydrocarbons utilizing a venturi to provide very high velocity through the reactor, though few structural details of the apparatus are specifically set forth. U.S. Pat. No. 3,408,417 discloses apparatus for the thermal cracking of hydrocarbons utilizing a throat or venturi between the combustor and the reactor to provide sonic or supersonic velocities in the reactor. The feed stock is injected just upstream of the throat. Other apparatus also using a constriction to produce high velocity is shown in U.S. Pat. Nos. 2,905,731 and 2,941,021.

Many other prior U.S. patents show various specific configurations for pyrolyzing apparatus or portions thereof. By way of example, U.S. Pat. No. 2,822,411 discloses a specific reactor and feed stock injection configuration with U.S. Pat. No. 2,934,410 discloses in detail a two-stage burner apparatus. U.S. Pat. No. 2,498,444 discloses an apparatus for the production of acetylene, that apparatus including a provision for the helical flow of air around the upstream or main combustion portion of the reaction tube prior to its injection into the tube. U.S. Pat. No. 2,985,698 discloses apparatus for pyrolyzing hydrocarbons using a two-stage pyrolysis, the apparatus including either a ceramic lined or fluid cooled reactor chamber.

U.S. Pat. No. 3,073,875 discloses an apparatus for the preparation of acetylene which includes means for providing a helical curtain of fluid on the inside walls of the pyrolysis chamber so that the reaction zone is surrounded and confined by the fluid screen flowing helically downward, thereby preventing the build-up of coke in that region. U.S. Pat. No. 3,843,744 discloses apparatus for controlling coke in the pyrolysis of hydrocarbons through acetylene and hydrogen which apparatus includes means for mixing stream and/or an inert gas at at least one critically located point in the system downstream from the feed injection. In addition to these patents, the following patents disclose various specific details of other equipment for the manufacture of hydrocarbon products by cracking and oxidation processes: U.S. Pat. Nos. 2,188,982; 2,630,461;

2,644,744; 2,813,138; 2,870,231; 2,882,960; 3,006,944; 3,285,847; 3,498,753; and 3,542,894.

U.S. Pat. No. 4,035,137 discloses a burner unit which includes means for introducing a primary stream of decoking air along the interior surface of the cylindrical wall of the burner. A second stream of decoking air may also be injected at a later section of the burner.

In addition to the above-mentioned patents, the Applicants are also aware of certain experimental apparatus and work which has been conducted in connection with a process for the thermal cracking of a hydrocarbon (i.e. hexane) and do ethylene, acetylene and other bi-products such as propylene and butadiene. Such a process was of an experimental nature to determine yields and feasibility and therefore involved only a short term testing which did not consider the prevention of coking which is a severe practical problem in commercial installations. There were no "decoking" apparatus or techniques used in the combustor or reactor sections of the experimental apparatus. Also the experimental process used hexane as a feed stock and accordingly the process and related equipment were not designed to handle and inject heavier and more troublesome hydrocarbon feed stocks such as are used with the present invention apparatus. The reactor used on this program had a water cooled combustor section terminating at a throat after which the flow area took an essentially step increase to the feed stock injection region. Thereafter the flow area flared outward to a larger cylindrical reactor terminating again in a sharply defined venturi for exhausting the products into a quench region for capture and analysis. The reactor was neither insulated nor water cooled though as previously mentioned, the apparatus was neither intended or suitable for any use other than a highly intermittent experimental use.

BRIEF SUMMARY OF THE INVENTION

Apparatus for operating in a continuous process for the selective production of ethylene by the diacritic cracking of heavy hydrocarbon feeds such as residual oils, heavy vacuum gas oils, atmospheric gas oils, crude oils and coal derived liquids. The apparatus includes a combustor for burning a fuel, which itself may be a heavy hydrocarbon, with oxygen to provide the hot combustion products to the reactor. The combustor is water cooled and includes gas filming with an appropriate gas such as $N_2$ or $CO_2$ to avoid coking in the combustor by preventing impingement of the fuel and combustion products on the combustor walls. The reactor is of reduced cross-section, also preferably utilizing gas filming to avoid coking on the reactor walls. Feed stock injectors are provided adjacent the reactor inlet for injecting the feed stock at a velocity sufficient to traverse approximately 60 to 70 percent of the reactor diameter. This encourages rapid heating of the injected feed stock while avoiding feed stock impingement on the reactor wall, with a basically cylindrical reactor encouraging a plug flow substantially free of low velocity or reverse flow regions. Adjacent the outlet end of the reactor is a quench section designed for the injection of a quench fluid to reduce the stream temperature below that at which further cracking will take place, with the quench injectors also being gas filmed to avoid the coking thereof. Thereafter a tubular heat exchanger is provided to remove additional heat from the primary flow stream from the reactor for recovery purposes, the heat exchanger again using gas filming to minimize the build-up of coking and tar build-up, particularly encouraged by the rapidly decreasing temperatures. The gaseous products are then further quenched and cooled for processing by conventional means to obtain the desired products. The system is designed to operate at elevated pressures which may range from 70 to 1000 psia. An exemplary design is disclosed.

BRIEF DESCRIPTION OF DRAWINGS

FIG. 3 is a partial cross-section taken along line 3—3 of FIG. 2.

FIG. 4 is a view taken along line 4—4 of FIG. 3.

FIG. 5 is a cross-section taken along line 5—5 of FIG. 3.

FIG. 6 is a partial cross-section taken along line 6—6 of FIG. 3.

FIG. 7 is a partial cross-section taken through the reactor, the quench region and the first stage heat exchanger.

FIG. 8 is a partial cross-section taken along line 8—8 of FIG. 7.

DETAILED DESCRIPTION OF INVENTION

Figure 1:
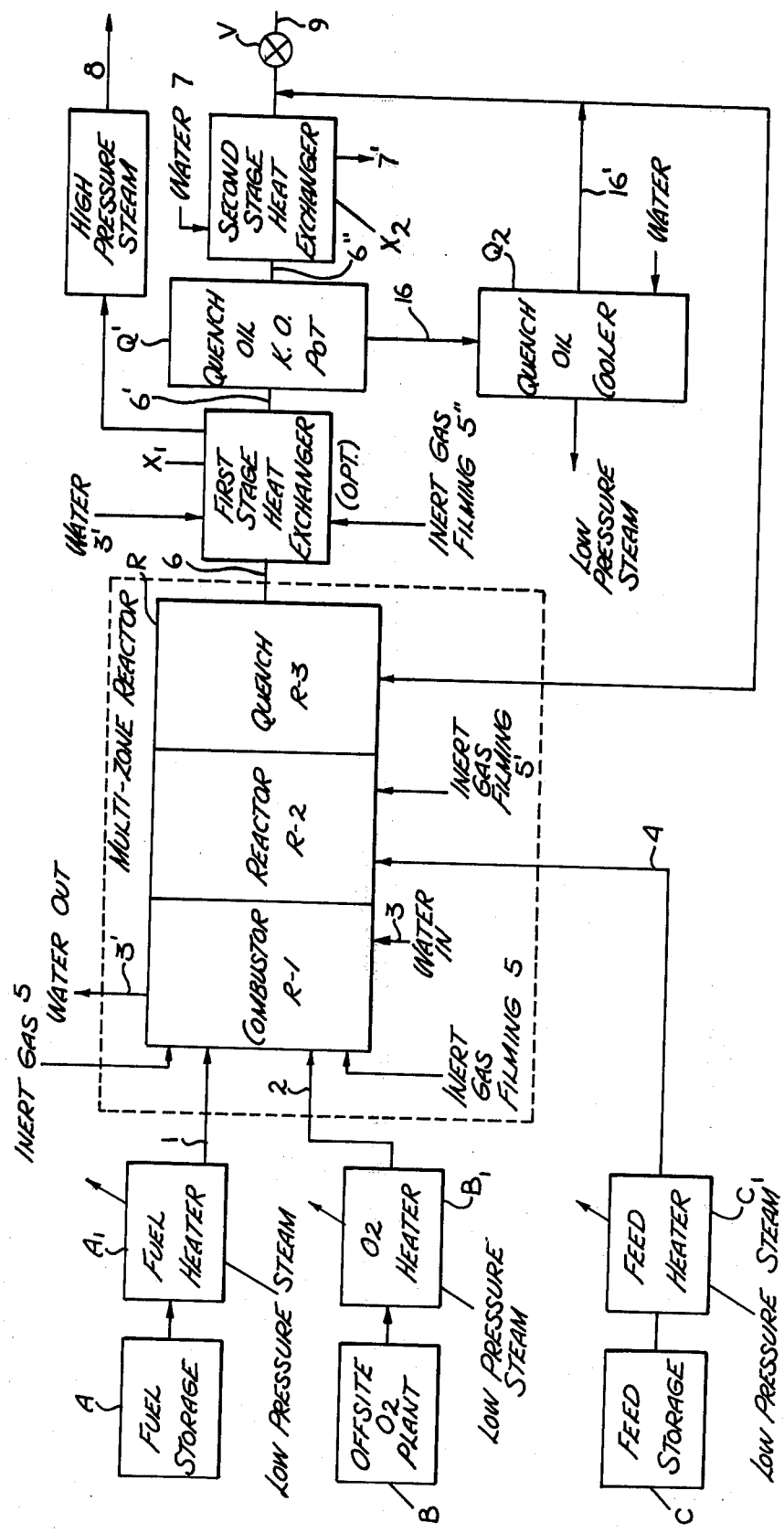
FIG. 1 is a schematic block diagram of the apparatus of the present invention.

The present invention apparatus is intended primarily for use in a continuous process for the selective production of ethylene by the diacritic cracking of heavy hydrocarbon feeds such as residual oils, heavy vacuum gas oils, atmospheric gas oils, crude oils and coal derived liquids. Accordingly in order to provide a more meaningful description of the specific embodiment disclosed herein, a description of the process intended to be practiced by the invention will first be given, specifically with reference to FIG. 1, which provides a block diagram of the diacritic cracking system up to the conventional separation apparatus.

The process begins by providing a fuel which is fed into the multi-zone reactor for oxidation or combustion with oxygen. Therefore, a suitable fuel such as diesel fuel or residual oil is fed from a storage container A through a fuel heater $A_1$ which is heated by low pressure steam (e.g., 125 psia steam) generated in the heat exchanger and quench stages of the process.

If a diesel fuel such as No. 2 diesel is used, the temperature of the fuel stream 1 entering into the combustor section R-1 of the multi-zone R is about 300° F. If a long residual oil is used as the primary fuel, the desired temperature of the fuel stream 1 leaving the fuel heater $A_1$ should be approximately 500° F. to 600° F. It should be understood that the preferred process uses as part of the fuel requirements the heavy liquid hydrocarbon oils and fuel oils which are produced in the recovery stages of the process and recycled to the fuel storage tank A. However, additional diesel fuel, residual oil or mixtures thereof can be added to the make-up fuel, as required, to augment the fuels being recovered and recycled by the downstream processing of the reaction products. Also being fed into the combustor section R-1 is a stream of oxygen 2 which has been supplied from an off-site $O_2$ plant B and heated by low pressure steam prior to entering the combustor. Preferably, the temperature of the $O_2$ stream leaving the heater $B_1$ should be approximately 200° F. to 300° F. The fuel is oxidized in the combustor R-1 to produce heat, carbon monoxide, carbon dioxide and water vapor.

The combustor R-1 is an adiabatic combustion chamber which is water cooled in order to prevent damage from high wall temperatures or thermal gradients which will greatly reduce the life of such chamber. The mixture is combusted by means of a conventional ignitor system which uses a high voltage spark to ignite the fuel-$O_2$ mixture (not shown). The ignitor system operates long enough to achieve ignition of the combustor, at which time it is shut off except for a low rate of oxygen which will act as a coolant for the ignitor parts during normal operation.

Cooling water 3 flows around the combustor section in a counter-flow direction to the combustion gases and preferably makes a helical path around the combustion chamber R-1 as it flows toward the head of the combustor. The water flow rate is controlled so that the exit temperature of water stream 3' is less than about 200° F. The cooling water 3 is brought into the multi-zone reactor R at a point close to the feed injectors located in section R-2 of the multi-zone reactor in order to also provide cooling of the feed injectors as well.

The water stream 3' which exits from the reactor is preferably used as the cooling medium in heat exchangers $X_1$ and $X_2$. All metal parts of the combustor R-1 are made from high corrosion-resistant steel. For example, all metal parts should preferably be made of type 316 stainless steel.

The operation of the combustor R-1 is steady state so as to optimize the flow conditions through the reactor. The $O_2$ to fuel ratio (by weight) should be between 2 and 3 preferably about 2.5). As previously discussed, the fuel used in the combustor R-1 is No. 2 diesel oil or a suitable residual oil plus the recycled fractions of fuel oils and heavy condensed hydrocarbons which are added. The temperatures in the combustor R-1 will typically be about 5400°-5600° F.

The operating pressure for the multi-zone reactor R is preferably above about 70 psia and lower than approximately 1000 psia. For the North Slope long residual oil feed, 80 psia was found to be an optimum pressure for both ethylene yield and equipment costs in the recovery section of the process. If it is desired to decrease the yield of acetylene, operating pressures of 250 psia to 1000 psia (preferably 600 to 1000 psia) are recommended.

Since the preferred process and apparatus uses heavy hydrocarbon fuels, extreme care must be taken to prevent carbon or coke formation. One of the techniques to minimize coke formation in the apparatus is to control the flow patterns so that the fuel being injected into R-1 is prevented from impinging upon the walls of the combustion chamber and the fuel stream is prevented from being transported to the walls by adverse gas flow conditions. The contact of hydrocarbon materials with the walls of the combustor result in some production of coke deposits and/or soot. Since the apparatus must operate for long periods of time with minimum maintenance, inert gas films in the combustor section R-1 are highly desirable. Therefore, the use of gaseous inert film 5 such as $CO_2$ or $N_2$ along the inner walls of the combustion chamber R-1 minimizes the potential of producing undesired carbon deposits in the combustor.

The fuel stream 1 is delivered from a variable speed pump (not shown) remotely located from the combustion section for safety purposes and at pressures compatible with the nozzle requirements of the oxygen stream. For example, it has been found that approximately a 100 psi increment over the chamber pressure is desirable when using a diesel No. 2 fuel with oxygen. The oxygen stream 2 should be introduced into the combustor R-1 without a swirl component. It is believed that impinging jet flow patterns injected radially into the combustor chamber R-1 are more predictable than swirling flow patterns; therefore, it is easier to develop the desired flow patterns and to maintain them as desired when there is no swirl.

The combustion chamber volume can be sized using rocket engine design criteria. For example, typical rocket engine stay times are between 2 and 40 milliseconds. The preferred stay time in the combustion chamber R-1 is approximately 10 milliseconds based upon a maximum exit velocity of about 171 feet/second. The length of the combustion chamber for this stage is about three times the diameter of the chamber. A well defined temperature profile is achieved across the exit of the combustor R-1 so as to optimize the reactions which must take place in the adjacent reactor section R-2.

The combustion gases from section R-1 of the multi-zone reactor R then pass into the reactor section R-2. The reactor section comprises feed injectors, a system for inert gas filming and a length of reaction chamber required to obtain the desired diacritic cracking. The combustion gases are used to provide the necessary heating for the diacritic cracking of the preselected hydrocarbon feed. The optimum residence time in the reaction chamber for the feeds contemplated is less than 10 milliseconds and generally in the 3 to 5 milliseconds range.

The feed stream 4 is supplied from a feed storage tank C and heated by a feed heater $C_1$ by low pressure steam in substantially the same manner that the fuel and $O_2$ streams are heated.

In the presently preferred process, the feeds are heavy hydrocarbon feeds, such as residual oils, crude oils, vacuum gas oils, atmospheric gas oil, coal derived liquids, heavier grades of petroleum oil, such as No. 6 oil, and mixtures thereof. Specific feedstocks which the process and apparatus can handle and which are economical to use are North Slope long residuals, residual oils from Indonesia and light Arabian and California crude oils. Also, crudes from North Slope, Indonesia and California, or fractions including vacuum gas oils or atmospheric gas oils, can also be used. The heavier oils sometimes require a recirculating system and steam tracing to keep the supply lines hot enough to handle the heavy oil.

It has been found that as long as the feeds are preheated to obtain about 100 S.S.U., fine atomization, for injection purposes, will be obtained. The temperature for crude oil feeds prior to injection vary between 100° F. to 600° F. depending upon how much of the volatile crude oil fractions have been previously removed prior to their use as a feed. For residual oils and vacuum gas oils, temperatures of about 500° F. to 700° F. are normally required. Atmospheric gas oils are heated to a temperature within the same range discussed above for crude oils.

The heated feed is introduced into the reaction chamber or section R-2 of the multi-stage reactor R in droplets having a size of about 40 to 100 microns. This can be achieved using conventional atomizers in which steam or other vapors or gases under pressure are used. The operating pressure of the atomizers or nozzles for injecting the above-mentioned type of feed stocks is usually approximately 300 psi above the reactor chamber pressure. The latter pressure parameter allows for good atomization and minimum pump requirements, provided that the liquid fuels have a viscosity of approximately 100 S.S.U. or less.

To obtain the desired mass flow requirement in the reaction chamber R-2, the number of atomizers is chosen to allow maximum spray coverage with maximum penetration of the combustion gas stream. The reaction chamber is sized to have a reference velocity of about 250 to 350 feet per second. The latter velocity is a deviation from other prior art approaches which have taught the use of sonic nozzles at the point of the feed injection. The present process results in better overall control of the mixing and cracking residence time.

As indicated previously, the feed is preferably injected into the reactor chamber R-2 without any swirl. While the gas velocity and heat transfer type wall construction used should minimize coking problems, in order to insure continuous use and low cost maintenance, a gas film 5' of inert $CO_2$ or $N_2$ is again introduced along the walls just downstream from the feed injectors. Such an inert gas is also used to shroud the injector nozzles as well. The inert gas film may be introduced with or without a swirl component.

It is desirable for the reactor to utilize feed injectors which are physically located in the combustion system cooling jacket. This is done to minimize internal coking of the injectors. Nitrogen purging should be used on start-up and shut-down to minimize internal coking.

The flow rate through the reactor must be kept high and must have an even flow profile to prevent recirculation of the products back into the reaction zone. Therefore, plug flow conditions should be maintained. The feed must be vaporized rapidly and uniformly to insure uniform reaction times. The endothermic nature of the reaction causes a drop of about 500° F. which helps to control the cracking process. Finally, the quench must be rapid and efficient to further control the reaction time. Thus, critical control of flow, temperature, time and pressure are of great importance in establishing the optimum conditions for producing ethylene from the feed stock.

Once the products of the cracking reaction are completed in section R-2, the gaseous product stream passes to the quench section R-3 of the multi-zone reactor R. The quench is accomplished by injecting a suitable hydrocarbon liquid ($C_6$ or higher) into the reactor to precisely control the reaction time of the cracking process. The quench section is very similar in construction to the reactor section R-2. The primary difference is that the quench injectors are located in a higher temperature environment than are the feed injectors. As with the reactor injectors, a nitrogen purge is used on start-up and shut-down to prevent internal coking. The temperature of the products after the injection of the feed is 2400° F. and after the cracking reaction and injection of the quench, the gaseous products are cooled to approximately 1600° F. to 1800° F. In general, the length of the quench chamber R-3 is approximately equal to or shorter than that of the reaction chamber R-2. Also, the quench chamber must have flow conditions which prevent recirculation back upstream and thus plug flow conditions must be maintained throughout the quench section R-3.

The hydrocarbon liquid 16' used as the quench medium is preferably a portion of the liquid hydrocarbon stream obtained from the quench oil cooler $Q_2$ which is located downstream and will be discussed in further detail hereinafter. However, any other convenient supply of suitable hydrocarbon fluid which can be used for quenching purposes can be utilized. The gaseous product stream 6 after the quench in R-3 has a temperature of approximately 1600° F. At this point, it is highly desirable to utilize an optional first stage heat exchanger $X_1$ in order to lower the temperature of the gases prior to having such gases diverted to various separating units and to recover heat in form of high pressure steam to partially off-set part of the fuel cost required for the combustion portion of the process. Also, lowering the gaseous product temperature at this point allows the pressure to be more easily regulated for optimum system operating purposes. Thus, a back pressure regulating valve V downstream can be used for maintaining the system operating pressure.

After the product stream 6' leaves the first stage heat exchanger $X_1$ it enters into a conventional quench oil knock out pot $Q_1$ where the temperature is dropped from 900° F. to about 600° F. At this stage, the gaseous product stream 6" is sent to a second stage heat exchanger while a condensed hydrocarbon stream 16 ($C_6$ or higher) is recovered and sent to a conventional quench oil cooler $Q_2$ which also includes a water jacket into which the water stream 3' from the combustor R-1 can be fed to produce low pressure steam for use in various stages of the present process. The condensed and cooled hydrocarbon stream 16' is recycled for use as the hydrocarbon quenching fluid in section R-3 of the multi-zone reactor and a portion of the hydrocarbon stream is added to the gaseous product stream 9 out of the second stage heat exchanger $X_2$.

The second stage heat exchanger $X_2$ is a high efficiency plate and fin type exchanger and cools the process stream from a temperature of 600° F. to approximately 300° to 350° F. Both the first stage heat exchanger and second stage heat exchanger are operated at elevated pressure on the product gas side thus providing a smaller system then if atmospheric pressure were used. This is possible since the pressure control valve V is located in the cooler gas stream downstream of the second stage heat exchanger. The water stream 7 into the second stage heat exchanger $X_2$ exits as stream 7' which can be recycled and used as part of water stream 3 into combustor section R-1 of the multi-zone reactor R. The gaseous product stream 9 leaves the second heat exchanger $X_2$ at a temperature of about 300° to 350° F. and is ready for conventional product recovery processing. The cooled reaction products 9 are separated in a product recovery section, using conventional and well known chemical engineering unit operations, into various streams which can be recovered as products or recycled in the process as required.

Figure 2:
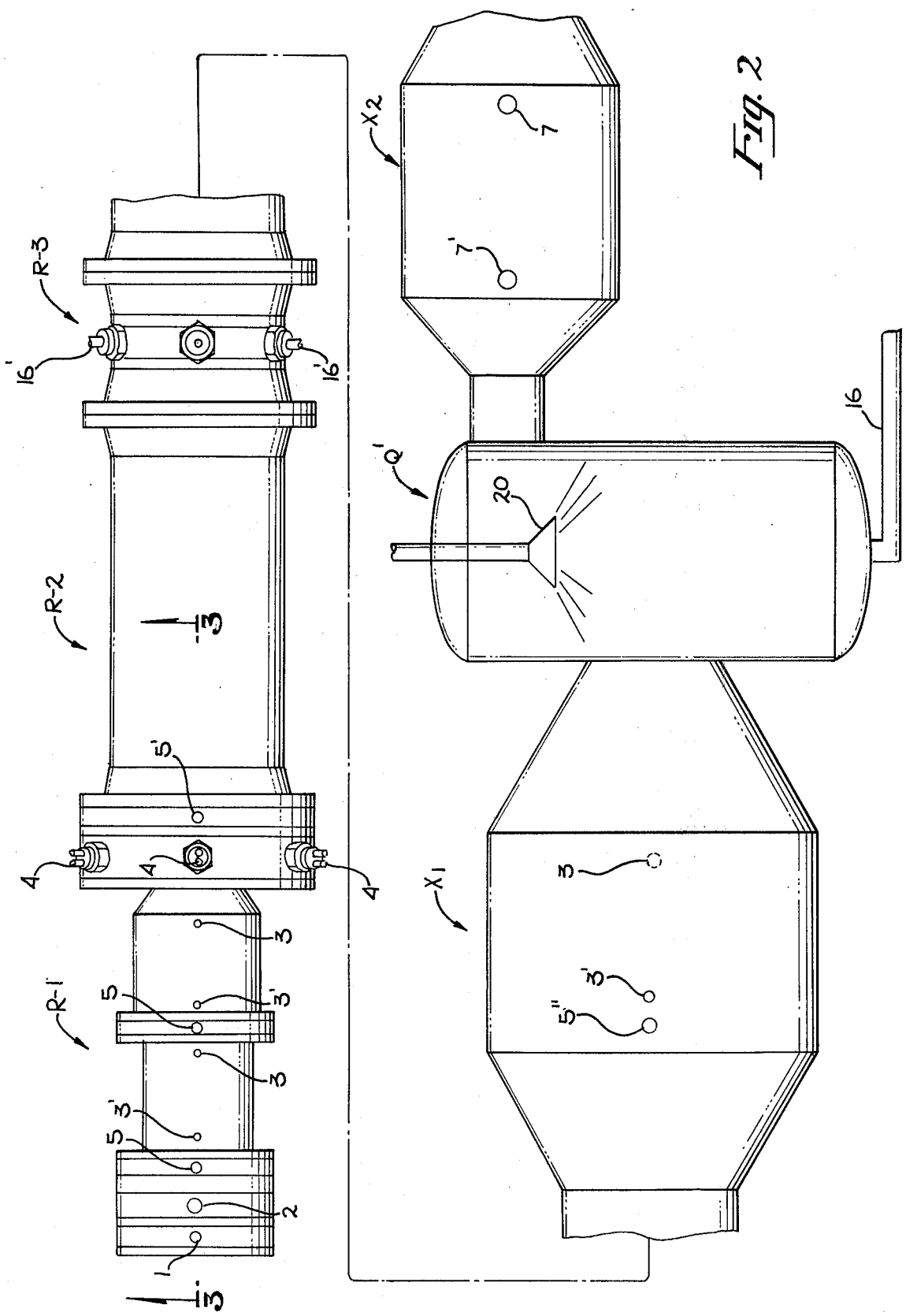
FIG. 2 is a side view in partial schematic form of the apparatus of FIG. 1.

Now referring to FIG. 2, a side view partially in schematic form of the apparatus of the preferred embodiment may be seen. The elements shown in this figure are the combustor R-1, the reactor R-2, the quench stage R-3, the first stage heat exchanger $X_1$, the quench oil knock-out pot Q' and the second stage heat exchanger $X_2$, together with the various flow lines identified in FIG. 1. As previously mentioned the purpose of the quench oil knock-out pot Q' is to remove most of the condensable constituents in the product stream prior to the entry of the stream into the second stage heat exchanger $X_2$, so that very little further condensation occurs in that heat exchanger, thereby allowing a substantially conventional design therefor. Since the purpose of the knock-out pot is accomplished by dropping the product stream temperature from approximately 900° F. to 600° F., a conventional design may be used for this purpose also, the pot being characterized by spray means 20 therein to spray the cooled quench oil into the flow stream so that the quench oil and condensables will be collected at the bottom of the knock-out pot for recirculation through line 16. The remaining components shown in FIG. 2 are generally of non-conventional design, being shown in detail in FIGS. 3 through 11.

Now referring to FIG. 3 a partial cross-section taken along line 3—3 of FIG. 2 illustrating the combustor R-1 and a portion of the reactor R-2 may be seen. At the upstream end of the combustor is a fuel and oxygen injector plate 22 for injecting oxygen and fuel into a region 24 of the combustor. Preferably the fuel and oxygen are injected so as to encourage thorough mixing thereof, though with injection angles, etc. selected so as to discourage or at least not encourage direct impingement of any of the fuel onto the inner wall 26 of the combustor. Located behind the injector plate 22 is an oxygen plenum 28 receiving oxygen through supply line 2 for injection into the combustor through injection ports 30. A second supply plenum, specifically a fuel plenum 32, is also provided for receiving fuel through line 1 for delivery to the individual tubes 34 passing through the oxygen plenum to the fuel spray heads 36 (see also FIG. 4). Details of the fuel spray heads and oxygen injection ports are not shown as such details are well known to those skilled in the art.

The combustion chamber is a cylindrical chamber defined by the inner wall 26 thereof, which wall is separated from an outer wall 38 by spacers 40 to define a water jacket surrounding the combustor to provide cooling thereto. The spacers 40, as may be best seen in FIG. 5, are arc segments approaching a full circle, leaving a small open segment 42 for water communication between the jacket compartments on either side on the divider. This in combination with a longitudinal member 44 extending between adjacent dividers defines a circular flow path in each portion of the water jacket between dividers, with the open regions 42 providing for water communication in a longitudinal direction between water jacket segments, thereby providing a basically helical cooling water flow path within the water jacket between the cooling water inlet line 3 and outlet line 3'.

At the periphery of the combustion chamber adjacent the plates 22 is an annular opening 46 facing downstream parallel to the immediately adjacent inner wall 26 of the combustor. This annular opening is supplied with a non-reactive gas ($CO_2$ in the preferred embodiment, though $N_2$ or other gases could also be used) through the supply line 5 and the annular supply plenum 48. A second slot plenum and supply line are also provided in the preferred embodiment at approximately the mid-point of the combustor, as may be seen in FIG. 3. The purpose of injecting a gas such as $CO_2$ or $N_2$ in this manner is to provide a layer or film of non-reactive gas adjacent the combustor wall which is substantially free of hydrocarbons so as to further prevent impingement of hydrocarbons with the combustor wall, thereby avoiding coking and other deposits in the combustor. While two such gas filming slots are provided in the embodiment shown, obviously greater numbers of slots may also be used if desired or required. In particular to the extent the flow in the injected film may be maintained laminar, very little mixing will occur so that maximum film effectiveness is obtained, though once the film goes turbulent substantial mixing occurs, making it desirable to inject another laminar film in that region. Obviously, therefore, the number of films to be injected will vary depending upon the size of the reactor, flow rates, etc.

It should be noted that the gas used for gas filming of the combustor is not a tempering gas as it is not injected for control (cooling) of the combustor gases, but instead is a non-reactive isolation layer injected for purposes of physical separation of the combustor reactants and combustion products from the reactor walls to maintain the walls substantially free of coke and other deposits. Thus the injected gas represents only a small percentage of the total combustor output, preferably being selected not only for its non-reactive characteristics in this environment but also preferably being selected as a gas easily recovered in the subsequent separation process for recycling.

Adjacent the combustor outlet, the combustor tapers downward to a somewhat smaller diameter, in the preferred embodiment to a diameter approximately two-thirds of the effective combustor diameter, thereby decreasing the flow area by approximately 44% and increasing the flow velocity accordingly. The transition from the substantially cylindrical combustor to the smaller substantially cylindrical reactor should be gradual and well faired in so that separation of the flow stream does not occur, and substantially uniform plug flow is maintained throughout. The combustor diameter is purposely made larger than the reactor diameter to provide sufficient residence time for the complete combustion of the fuel while maintaining reasonable combustor length to diameter ratios, yet still providing higher velocity flow in the reactor as hereinbefore described.

Figure 9:
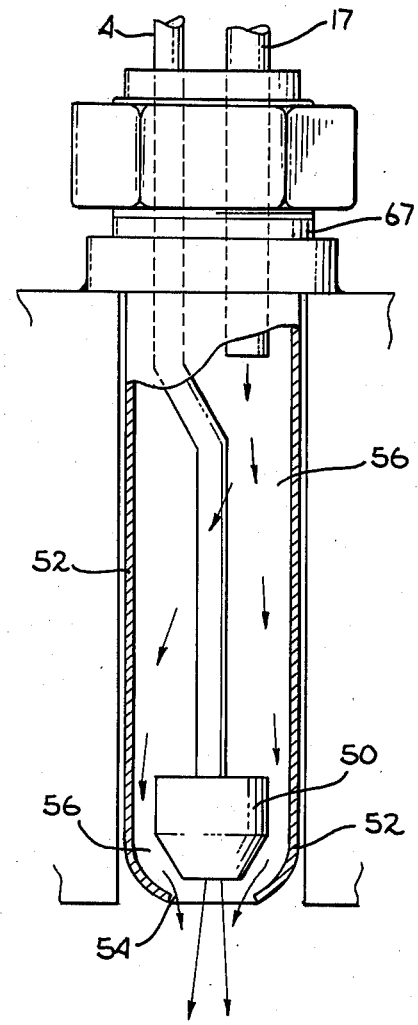
FIG. 9 is a partial cross-section taken through one of the quench injector assemblies.

Details of the feed stock injectors are shown in FIG. 9, with their general positioning around the circumference of the flow tube being shown in FIG. 6. The injector head 50 may be of conventional design, as the handling of the heavy feed stocks is accommodated through the heating thereof to provide a suitably low viscosity and suitable pressurization thereof for appropriate atomization of the feed stock by the heads. Thus the feed stock is delivered to the heads through lines 4 manifolded together to receive the feed stock from the feed heater $C_1$ (see FIG. 1). The injector heads themselves are shrouded by a cover 52 having an opening 54 in the end thereof through which the spray of the injectors 50 passes. The region 56 between the injector heads 50 (and the supply lines therefor) and the cover 52 is connected to a gas supply line 17 so that the injector heads as well as the supply line therefor are shrouded by the gas being injected through line 17. This prevents overheating of the injectors and the feed stock therein, thereby preventing the boiling off of volatiles or the accummulation of deposits within the injectors and supply lines. It also provides a shroud of non-reactive gas over the injectors, thereby preventing coking on the outer surfaces of the injectors by avoiding impingement thereon of the combustion products from the combustor. In that regard the covers or shrouds 52 are disposed in the remnants of the non-reactive gas films injected in the combustor so as to not themselves be subjected to significant coking. The injectors should be selected and operated so that the feed stock injected thereby penetrates the radius of the local flow tube, most preferably on the order of 60 to 70% of the diameter of the flow tube so as to encourage rapid and uniform mixing of the hot combustion gases with the injected feed stock. Care should be taken however not to inject the feed stock at too high a pressure so as to cause the feed stock to entirely penetrate the diameter of the flow tube so as to impinge on the opposite wall, as such impingement will result in the coking thereof. Also sufficient numbers of injectors should be utilized so that circumferential variations in the feed stock-combustion products mix are held to a minimum, six injectors being used in the preferred embodiment as may be seen in FIG. 8, though for larger installations greater numbers of injectors are probably desired. The individual injector assemblies are retained in position by a conventional Swagelok fitting 67, allowing repositioning of the injectors based on operating and coking considerations.

Immediately downstream of the feed stock injectors is another provision for gas filming comprising an aft-directed annular slot 58 supplied with a non-reactive gas through the supply line 60. This provides a film of non-reactive gas along the wall of the reactor R-2 to prevent coking in this region. The reactor wall itself is preferably insulative rather than being jacketed for a cooling fluid, the specific embodiment shown utilizing two layers of insulating materials, specifically an outer layer 62 comprised of an M-26 insulating block with an inner layer 64 comprised of Purocast alumina refractory, both manufactured by Kaiser Refractories of Oakland, California. These materials allow the inner wall of the reactor to remain hot, thereby minimizing radial temperature variations in the reactor flow stream tube and discouraging the formation of coke and other deposits on the reactor walls. Obviously however, depending upon the size and operating conditions of the apparatus, additional gas filming means may be provided at one or more additional stations along the length of the reactor.

As the selective diacritic cracking progresses along the length of the reactor the temperature of the gas stream is reducing because of the endothermic reactions occuring, though additional cooling of the stream is required to terminate the reactions. For this purpose a series of quench fluid spray nozzles 66 are disposed about the periphery of the reactor adjacent the outlet therefrom and may be seen in FIGS. 7 and 8. As with the feed stock injector nozzles, gas filming is used, so that the individual injector assemblies are generally in accordance with the design of FIG. 9. These nozzles controllably inject the quench fluid, preferably a readily recoverable quench oil so that the temperature of the reactor flow stream drops sufficient to arrest further cracking. (While the quench zone is shown as a broken section, a quench zone of substantial length is used, in the preferred embodiment being approximately equal to the reactor length of approximately eighteen inches.) In this regard a sufficient quench could be used to reduce the flow stream temperature to that suitable for delivery of the cracking products to the separation equipment, though this wastes substantially all of the heat remaining in the flow stream. As another alternative the quench could reduce the temperature of the flow stream to the point where most of the condensables in the flow stream were actually condensed out (i.e. approximately 600° F.) so that the remainder of the heat in the flow stream could be recovered using conventional heat exchangers without substantial coking and other residue problems. However, in the preferred embodiment the quench R-3 only drops the flow stream temperature sufficient to arrest cracking, specifically approximately 1600° to 1800° F., with a novel first stage heat exchanger X-1 recovering heat from the flow stream to reduce its temperature to approximately 900° F.

Figure 10:
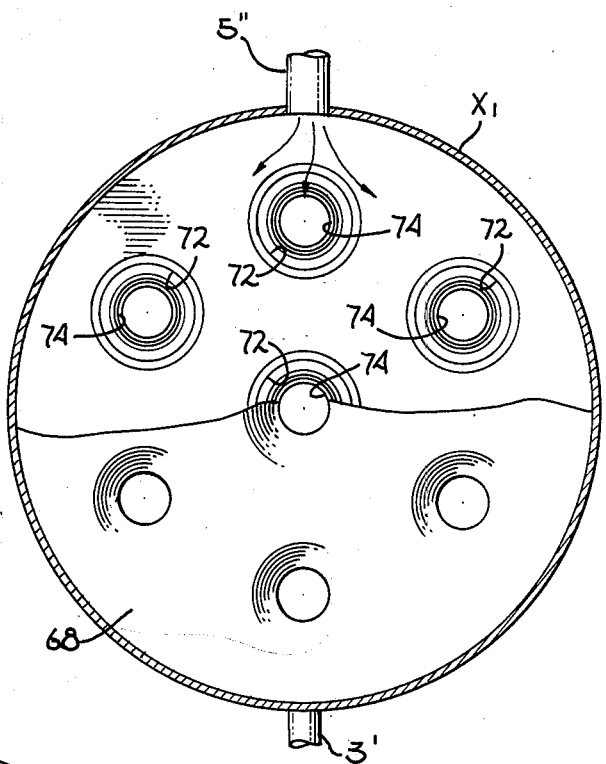
FIG. 10 is a cross-section taken along line 10—10 of FIG. 7.
Figure 11:
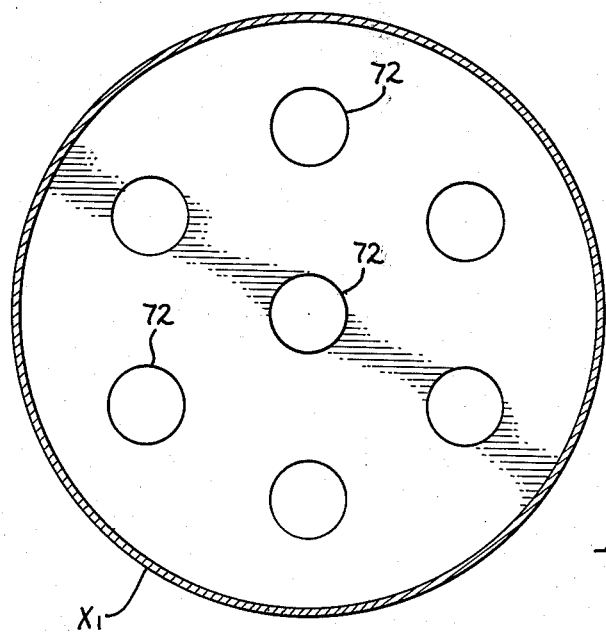
FIG. 11 is a cross-section taken along line 11—11 of FIG. 7.

The details of the first stage heat exchanger may be best seen in FIGS. 7, 10 and 11. This heat exchanger presents the most difficult problem with respect to the problem of possible coking, especially with the heavy feed stocks used in the present process. As may be seen in the figures the exchanger is a modified tube and shell type utilizing gas filming to minimize coking in the critical regions. The exchanger contains a heat shield 68 which protrudes into each cooling tube. Under this shield is a second shield 70 which acts as a flow directional guide to feed the non-reactive gas supplied through line 5 along the inner wall of each water-jacketed tube 72. The gas film thereby created along the inner wall of the tubes is split by a series of slightly conical baffle plates 74, 76 and 78 so that a small portion of the film flows over the inner surface of baffle 74, the remainder thereof flowing to the outside of the baffle 74 so that a portion thereof may flow over the inner surface of baffle 76, the remainder passing under baffle 76 for further division by baffle 78, etc. As before, the purpose of filming of this type is to provide an at least initially laminar flow film over the surfaces of the walls of the heat exchanger that would otherwise be subjected to the gas stream, re-establishing a new laminar film before the previous film becomes sufficiently turbulent to allow contact of the main flow stream with the heat exchanger walls.

The purpose of the specific first stage heat exchanger design and the manner of operation thereof are as follows. The heat shield 68 is relatively well thermally isolated from both the water jacketed tubes 72 and the non-reactive gas being supplied through line 5", thereby being allowed to rise to a temperature substantially equal to the flow stream entering the heat exchanger so as to minimize coking thereon. (Since the heat shield is not used for heat transfer purposes minor deposits thereon do not degrade the performance of the heat exchanger. Also the heat shield is readily removable for cleaning, thereby minimizing the down time when cleaning is necessary). Even in the initial heat transfer region of the heat exchanger gas filming is used, specifically over the inside surface of baffle 74. A new boundary layer starts to build up on baffle, 74 though so long as that boundary layer remains laminar no significant coking on the baffle will occur. While the heat transfer between the free stream and the baffle 74 will be somewhat reduced by the presence of the boundary layer, clearly it will not be eliminated, and substantial heat transfer to the baffle will occur by both convection and radiation from the free stream. (Free carbon in the flow stream will result in a substantial emissivity by the stream, which together with the temperature thereof contributes very substantial heat transfer by radiation.) Obviously additional heat transfer between baffle 74 and the water jacket tubes 72 is required to complete the heat recovery. However, the heat transfer in this region is accommodated by the fact that the surface emissivities may be made relatively high, and substantial heat transfer by convection will occur, particularly since it is not necessary to maintain laminar flow between the baffles themselves and the tubes 72. By gas filming in this manner, coking in the heat exchanger may be substantially eliminated while only reducing the heat transfer rates by some percentage, which of course may be made up for by increased heat exchanger area or increased temperature differential between the flow stream and the heat exchanger fluid. Thus this first stage heat exchanger allows the recovery of substantial amounts of heat from the flow stream, yet preserves the advantages of minimum down time provided by the design of other aspects of the apparatus.

The apparatus hereinbefore described is preferably designed to operate at elevated pressures, as operating pressures of approximately 70 to 1000 psia are preferred for the process to be practiced by this apparatus when utilizing feed stocks such as North Slope crude oil and coal derived residual oils. In addition to pressure, other instrumentation and control is provided in order to assure continuous, efficient and safe start-up and operation. For example, the primary control in the apparatus is on the fuel flow to the combustor, readily controlled by techniques well known in the prior art. The mass flow, fuel feed, quench and oxygen streams are sensed by flow meters. Regulation of the fuel flow rate is based upon the excess oxygen, carbon dioxide and carbon monoxide measured values at the discharge plane of the combustor chamber R-1. Additional regulation is made by use of a gas chromatograph at the outlet and the discharge valve pressure. These controls will provide modulation of the fuel being supplied to the combustion chamber R-1.

Start up of the system requires a purge sequence prior to pilot ignition. Simultaneously, a purge is initiated to the feed and quench injectors to assure that all previous feed or oil has been removed from the nozzles. Once the purge is complete, a light off of the combustor is made by first initiating oxygen flow and then adding the fuel flow. The system is brought up to a low mass flow and pressure setting, and at a mixture ratio that results in an effective reactor temperature will full operating conditions. This temperaure is approximately 2400° in the reactor. A soak period of about one-half hour allows the hardware temperatures to stabilize, probably in the order of a half-hour.

After the soak period, the mass flows are increased to achieve near operating pressure levels. Once this condition is achieved, the feed and quench are initiated and followed by an increase in the combustion fuel flow. This sequence is programmed so that the rates are increased proportionately; otherwise, the reactor walls could be over-heated by the temperatures which could be generated by the combustor. Cooling water flow rates are also programmed to allow for a smooth transistion to steady state.

The combustor has an infrared flame detection system (not shown) which terminates all flow systems in an event of flame failure in the combustor. The prime control is on the combustor system; all other controls are secondary in relationship to the operation of the burner.

Although the present invention has been described in considerable detail with reference to certain preferred process steps and equipment, it will be understood that certain modifications can be effected by those skilled in the art without departing from the scope of the invention as described hereinabove and as defined in the appended claims.

We claim:

1. Apparatus for the diacritic cracking of hydrocarbon feedstocks to obtain high yields for ethylene comprising:

a combustor means, said combustor means having an inner combustor wall defining a generally cylindrical combustion chamber, an outer combustor wall, and a fuel and oxidizer injector plate disposed transversely to said inner combustor wall and adjacent to the inlet of said combustor means for axially injecting a hyrocarbon fuel and an oxidizer into said combustion chamber to create a flow stream substantially without tangential flow components of high temperature gaseous combustion products, said combustion chamber having a length approximately three times its initial diameter, said diameter tapering to a diameter approximately two-thirds its initial diameter adjacent the combustor outlet, and said combustion chamber having a plurality of annular gas filming slots facing downstream parallel and adjacent to said inner combustor wall, for directing a non-reactive gas film along said inner combustor wall to prevent impingement of hydrocarbons upon said inner combustor wall;

feed stock injection means coupled to said combustor means, said injection means having a plurality of feed stock injectors disposed about the periphery of the flow stream, each of said feed stock injectors having an injector head, a feed stock supply line, and a means for providing a layer of non-reactive gas film flowing around said feed stock supply line and said injector head, for injecting a hydrocarbon feed stock in finely dispensed droplets into the flow stream received from the combustor means;

a reactor means coupled to said feed stock injection means for receiving the flow stream of hot combustion products and feed stock and defining a flow path of predetermined length within which cracking may take place, said reactor means having an inner reactor wall defining a reactor chamber and an outer reactor wall, and having means for directing a non-reactive gas film along said inner reactor wall;

quench means coupled to said reactor means to receive the flow stream therefrom, said quench means having a plurality of quench fluid spray nozzles around the periphery of said inner reactor wall and having a means for providing a layer of non-reactive gas filming flowing around said spray nozzles, said spray nozzles being a means for spraying a quench fluid into the fluid stream to reduce the temperature thereof by an amount sufficient to terminate substantial cracking reactions;

a first heat exchanger coupled to said quench means for recovering heat from the flow stream from the quench means, said first heat exchanger being a tube and shell type of exchanger, said first heat changer having a plurality of water-jacketed cooling tubes, with each of said cooling tubes having means for directing non-reactive gas films along the inner walls thereof to discourage the impingement of the flow stream thereon; and a knock out pot means coupled to said first heat exchanger for spraying a coolant into the flow stream coming from said first heat exchanger to reduce the stream temperature to condense out a majority of condensable hydrocarbons in the flow stream.

2. The apparatus of claim 1 further comprised of a second heat exchanger coupled to said knock out pot means for further recovery of heat from the flow stream.

3. The apparatus of claim 1 wherein at least one layer of an insulating material is disposed between said inner reactor wall and said outer reactor wall.

4. The apparatus of claim 1 wherein said reactor means has a flow stream cross-sectional area which is in the range of approximately 40% to 50% of the maximum cross-sectional area of the combustor means flow stream.

5. The apparatus of claim 1 wherein a space formed by said inner combustor wall and said outer combustor wall comprises a fluid jacket for the passage of a cooling fluid therethrough.

6. The apparatus of claim 1 wherein the combustion chamber has an annular gas filming slot adjacent the fuel and oxidizer injector plate, and at least one other annular gas filming slot is provided along said inner combustor wall.

7. The apparatus of claim 1 further comprising an oxidizer supply plenum behind the fuel and oxidizer injector plate for receiving oxidizer, a plurality of oxidizer injection ports connected to said oxidizer supply plenum for injecting oxidizer axially into said combustion chamber, a fuel supply plenum for receiving fuel, a plurality of individual fuel supply tubes connected to said fuel supply plenum and passing through said oxidizer supply plenum, with each fuel supply tube connected to a fuel spray head for spraying fuel axially into said combustion chamber.

8. The apparatus of claim 1 wherein the means for directing a non-reactive gas film along said inner reactor wall includes at least one annular slot plenum for supplying said non-reactive gas film.

9. The apparatus of claim 1 wherein the quench means is of approximately the same length as the reaction chamber.

10. The apparatus of claim 1 wherein the means for shrouding with a non-reactive gas film said feed stock supply line and said injector head comprises a feed stock injector cover open at the end thereof, a shrouded region defined by the injector head, the feed stock supply line connected to the injector head, and the feed stock injector cover, and gas supply lines connected to said shrouded region for supplying a non-reactive gas film for shrouding and cooling said feed stock supply line and said injector head.

11. The apparatus of claim 1 wherein the first heat exchanger further comprises a plurality of baffle means disposed adjacent and along the inner walls of said cooling tubes, for directing a portion of the initial non-reactive gas film along the flow stream facing surface of each respective baffle means.

12. The apparatus of claim 1 including means for cooling said combustor means, comprising a cooling water flow path surrounding the inner combustor wall, said flow path being defined by the inner combustor wall, the outer combustion wall, a plurality of arc segment spacers connecting the inner combustor wall and the outer combustor wall, a plurality of longitudinal members extending between adjacent spacers, at least one water inlet line connected to said flow path, and at least one cooling water outlet line connected to said flow path, said flow path being substantially helical between said water inlet and water outlet.

13. The apparatus of claim 12 wherein said feed stock injectors are adjacent to at least one cooling water inlet line, whereby said water inlet line provides cooling of the feed stock injectors.

14. Apparatus for the diacritic cracking of hydrocarbon feed stocks to obtain high yields of ethylene comprising:

a combustor means, said combustor means having an inner combustor wall defining a cylindrical combustion chamber of substantially uniform cross-sectional area, an outer combustor wall, and including a fuel and oxidizer injector plate disposed transversly to said inner combustor wall and adjacent the inlet of said combustor means for axially injecting a hydrocarbon fuel and an oxidizer into said combustion chamber to create a flow stream substantially without tangential flow components of high temperature gaseous combustion products, said combustion chamber having a length approximately three times its diameter, said combustion chamber tapering to a diameter approximately two-thirds its initial diameter adjacent the combustor outlet, and said combustion chamber having a plurality of annular gas filming slots facing downstream parallel and adjacent to said inner combustor wall, for directing a non-reactive gas film along said inner combustor wall to prevent impingement of hydrocarbons upon said inner combustor wall, said combustor being jacketed to provide for the flow of coolant therethrough, said combustor further including means for providing at least one non-reactive gas film along the inner wall thereof;

feed stock injection means coupled to said combustor means, said injection means having a plurality of feed stock injectors disposed about the periphery of the flow stream, each of said feed stock injectors having an injector head, a feed stock supply line and a means for providing a layer of non-reactive gas film flowing around said feed stock supply line and said injector head, for injecting a hydrocarbon feed stock in finely dispensed droplets into the flow stream received from the combustor means;

a reactor means coupled to said feed stock injection means for receiving the flow stream of hot combustion products and feed stock and defining a flow path of predetermined length and substantially uniform cross-sectional area within which cracking may take place, said reactor means having an insulative inner reactor wall, and an outer reactor wall, said inner reactor wall having at least one annular slot plenum having an opening adjacent the inner reactor wall and directed downstream to dispense a continuous gas film along the inner reactor wall for providing at least one nonreactive gas film along the inner wall thereof to discourage the buildup of coke deposits;

quench means coupled to said reactor means to receive the flow stream therefrom, said quench means having a quench zone approximately the same length as the reaction chamber, and having a plurality of quench fluid spray nozzles around the periphery of said inner reactor wall, and having a means for providing a nonreactive gas filming flowing around said spray nozzles, said quench means being a means for cooling the fluid stream temperature by an amount sufficient to terminate substantial cracking reactions; and a first heat exchanger coupled to said quench means for recovering heat by the dropping of the temperature of the flow stream received from the quench means to a temperature above the temperature at which substantial condensation commences, said first heat exchanger being a tube and shell type of exchanger, each tube in said heat exchanger including means for directing non-reactive gas films along the inner walls thereof to discourage the buildup of coke deposits.

15. The apparatus of claim 14 wherein said reactor means has a flow stream cross-sectional area which is in the range of approximately 40% to 50% of the maximum cross-sectional area of the combustor means flow stream.

16. The apparatus of claim 14 wherein the combustion chamber has an annular gas filming slot adjacent the fuel and oxidizer injector plate, and at least one other annular gas filming slot is provided along said inner combustor wall.

17. The apparatus of claim 14 further comprising an oxidizer supply plenum behind the fuel and oxidizer injector plate for receiving oxidizer, a plurality of oxidizer injection ports connected to said oxidizer supply plenum for injecting oxidizer into said combustion chamber, a fuel supply plenum for receiving fuel, a plurality of individual fuel supply tubes connected to said fuel supply plenum and passing through said oxidizer supply plenum, with each fuel supply tube connected to a fuel spray head for spraying fuel into said combustion chamber.

18. The apparatus of claim 14 wherein the means for shrouding with a non-reactive gas film said feed stock supply line and said injector head comprises a feed stock injector cover open at the end thereof, a shrouded region defined by the injector head, the feed stock supply line connected to the injector head, and the feed stock injector cover, and gas supply lines connected to said shrouded region for supplying a non-reactive gas film for shrouding and cooling said feed stock supply line and said injector head.

19. The apparatus of claim 14 further comprised of a knock out pot means coupled to said first heat exchanger for spraying a coolant into the flow stream coming from said first heat exchanger to reduce the stream temperature to condense out a majority of condensable hydrocarbons in the flow stream.

20. The apparatus of claim 19 further comprised of a second heat exchanger coupled to said knock out pot means for further recovery of heat from the flow stream.

21. Apparatus for the diacritic cracking of hydrocarbon feedstocks to obtain high yields of ethylene comprising:

a combustor means, said combustor means having a combustion chamber and including means for injecting a hydrocarbon fuel and an oxidizer into said combustion chamber to create a flow stream of high temperature gaseous combustion products;

feed stock injection means coupled to said combustor means for injecting a hydrocarbon feed stock in finely dispensed droplets into the flow stream received from the combustor means;

a reactor means coupled to said feed stock injection means for receiving the flow stream of hot combustion products and feed stock and defining a flow path of predetermined length within which cracking may take place;

quench means coupled to said reactor means to receive the flow stream therefrom, said quench means being a means for spraying a quench fluid into the flow stream to reduce the temperature thereof by an amount sufficient to terminate substantial cracking reactions, and a first heat exchanger coupled to said quench means for recovering heat from the flow stream received from the quench means, said first heat exchanger being a tube and shell type of exchanger, each tube in said heat exchanger including means for directing non-reactive gas films along the inner walls thereof to discourage the direct impingement of the flow stream thereon, said means for directing non-reactive gas films along the inner walls of said first heat exchanger being a means for directing an initial non-reactive gas film along the inner walls of said heat exchanger tubes, and a plurality of baffle means disposed adjacent and along the inner walls of said heat exchanger tubes, each of said baffle means being a means for directing a portion of the initial non-reactive gas film along the flow stream facing surface of each respective said baffle means.

* * * * *